US011922898B2

(12) United States Patent
Ishii

(10) Patent No.: US 11,922,898 B2
(45) Date of Patent: Mar. 5, 2024

(54) DISPLAY DEVICE AND SOURCE DRIVER

(71) Applicant: LAPIS Technology Co., Ltd., Yokohama (JP)

(72) Inventor: Hiroaki Ishii, Yokohama (JP)

(73) Assignee: LAPIS TECHNOLOGY CO., LTD., Yokohama (JP)

( * ) Notice: Subject to any disclaimer, the term of this patent is extended or adjusted under 35 U.S.C. 154(b) by 0 days.

(21) Appl. No.: 18/185,987

(22) Filed: Mar. 17, 2023

(65) Prior Publication Data

US 2023/0317027 A1 Oct. 5, 2023

(30) Foreign Application Priority Data

Mar. 29, 2022 (JP) ................................ 2022-053677

(51) Int. Cl.

| | |
|---|---|
| ***G09G 3/00*** | (2006.01) |
| ***G09G 3/20*** | (2006.01) |
| ***G09G 3/36*** | (2006.01) |

(52) U.S. Cl.

CPC .......... *G09G 3/3688* (2013.01); *G09G 3/006* (2013.01); *G09G 3/2096* (2013.01); *G09G 3/3696* (2013.01); *G09G 2320/0673* (2013.01); *G09G 2330/12* (2013.01)

(58) Field of Classification Search

None

See application file for complete search history.

(56) References Cited

U.S. PATENT DOCUMENTS

2011/0199344 A1* 8/2011 Kimura .................... G09G 3/20 345/204
2012/0127145 A1* 5/2012 Jang ......................... G09G 3/20 345/204
2012/0242628 A1* 9/2012 Yuan ........................ G09G 3/20 345/204
2013/0113777 A1* 5/2013 Baek ...................... G09G 5/008 345/212
2014/0078133 A1* 3/2014 Lee ...................... G09G 3/2092 345/213
2014/0160176 A1* 6/2014 Nose .................... G09G 3/3685 345/102
2017/0132966 A1* 5/2017 Lim ....................... G09G 5/008

(Continued)

FOREIGN PATENT DOCUMENTS

JP 2000-275610 A 10/2000

*Primary Examiner* — Patrick N Edouard
*Assistant Examiner* — Peijie Shen
(74) *Attorney, Agent, or Firm* — Rabin & Berdo, P.C.

(57) ABSTRACT

A display device includes a display controller and a plurality of source drivers that supply gradation voltage signals to a plurality of pixel parts in a display panel. The plurality of source drivers each includes a setting register that stores setting data, at least one calculation circuit that performs calculation based on the setting data and calculates a setting value for a gradation voltage signal to be outputted, a source output unit that outputs a gradation voltage signal based on a video data signal and the setting value, and a code value calculation unit that calculates an error detection code value based on the calculation result of the calculation circuit. The display controller detects failure that has occurred in the calculation circuit in the plurality of source drivers, based on a calculation result of the code value in each of the plurality of source drivers.

9 Claims, 6 Drawing Sheets

(56) References Cited

U.S. PATENT DOCUMENTS

| | | | | |
|---|---|---|---|---|
| 2018/0068600 | A1* | 3/2018 | Kim | G09G 3/2096 |
| 2018/0122295 | A1* | 5/2018 | Kim | G09G 3/3275 |
| 2018/0240397 | A1* | 8/2018 | Hara | G09G 3/30 |
| 2019/0235950 | A1* | 8/2019 | Kurihara | G09G 5/003 |
| 2019/0237042 | A1* | 8/2019 | Hu | G09G 5/008 |
| 2019/0392742 | A1* | 12/2019 | Muraki | G09G 3/006 |
| 2020/0202818 | A1* | 6/2020 | Kuroiwa | G09G 5/393 |
| 2020/0342796 | A1* | 10/2020 | Kobayashi | G09G 3/2096 |
| 2021/0272489 | A1* | 9/2021 | Ishii | G09G 3/3688 |
| 2022/0310033 | A1* | 9/2022 | Ishii | G09G 3/20 |
| 2023/0023470 | A1* | 1/2023 | Lee | G09G 3/32 |
| 2023/0034077 | A1* | 2/2023 | Ichikura | G09G 3/3275 |

* cited by examiner

DISPLAY DEVICE AND SOURCE DRIVER

CROSS REFERENCE TO RELATED APPLICATION

This application is based upon and claims the benefit of priority of the prior Japanese Patent Application No. 2022-053677, filed on Mar. 29, 2022, the entire contents of which are incorporated herein by reference.

TECHNICAL FIELD

The present invention and relates to a display device and a source driver.

BACKGROUND ART

In recent years, liquid crystal display devices have been more widely used for critical safety parts such as in-vehicle electronic mirrors and clusters. Because such in-vehicle liquid crystal display devices are related to passengers' safety, it is necessary to design them to ensure functional safety to keep a driver or the like safe even when malfunction occurs. There have been display devices proposed that can detect a defect or malfunction of a display panel and drivers so that failure of a display device can be detected immediately (Japanese Patent Application Laid-open Publication No. 2000-275610, for example).

A source driver controls source lines and a gate driver based on setting data saved in a setting register installed therein. Failure of this setting register or a logic circuit disposed in a later stage than the setting register (logic circuit for calculating the number of effective output channels or gamma setting, for example) often causes a display problem of a display device.

SUMMARY OF THE INVENTION

Problems to be Solved by the Invention

In a display device equipped with a display controller such as a TCON (timing controller), a write function of the TCON writes various types of data from the TCON to a setting register installed in a source driver. Also, a read function of the TCON reads data values stored in the setting register of the source driver out to the TCON.

Thus, if a defect or failure occurs in the setting register itself, the TCON is able to detect the defect or failure of the setting register based on the data read from the setting register. However, even with the read function of the TCON, it was not possible to detect a defect of a logic circuit disposed in a later stage than the setting register such as a calculation circuit for the number of effective output channels, a calculation circuit for the gamma setting, and the like.

The present invention was made in view of this situation, and an object thereof is to provide a display device that can detect failure of a logic circuit installed in a later stage than a setting register inside a source driver.

A display device of the present invention includes: a display panel having a plurality of data lines and a plurality of gate lines, and a plurality of pixel parts disposed at respective intersections of the plurality of data lines and the plurality of gate lines and arranged in a matrix; a display controller that outputs a video data signal indicating a video to be displayed in the display panel; and a plurality of source drivers each receiving the video data signal from the display controller and supplying a gradation voltage signal to the plurality of pixel parts through the plurality of data lines based on the video data signal, wherein each of the plurality of source drivers includes: a setting register that stores setting data regarding an operation of the source driver; at least one calculation circuit that performs calculation based on the setting data stored in the setting register to derive a setting value for the gradation voltage signal to be outputted; a source output unit that outputs the gradation voltage signal to be supplied to each of the plurality of pixel parts based on the video data signal and the setting value; and a code value calculation unit that calculates an error detection code value corresponding to the setting value based on the calculation result of the calculation circuit, and wherein the display controller detects failure that has occurred in the calculation circuit in the plurality of source drivers, using information based on a calculation result of the code value in each of the plurality of source drivers.

A source driver according to the present invention is a source driver that is connected to a display panel having a plurality of data lines, a plurality of gate lines, and a plurality of pixel parts disposed at respective intersections of the plurality of data lines and the plurality of gate lines and arranged in a matrix, wherein a plurality of the source drivers are arranged along an extending direction of the gate lines, wherein the source driver receives a video data signal indicating a video to be displayed in the display panel from a display controller and supplies a gradation voltage signal to the plurality of pixel parts through the plurality of data lines based on the video data signal, wherein the source driver includes: a setting register that stores setting data regarding an operation of the source driver; at least one calculation circuit that performs calculation based on the setting data stored in the setting register to derive a setting value for the gradation voltage signal to be outputted; a code value calculation unit that calculates an error detection code value corresponding to the setting value based on the calculation result of the calculation circuit; and a comparison unit that obtains the error detection code value calculated in a different source driver, compares the error detection code value calculated in the different source driver with the error detection code value calculated by the code value calculation unit, and stores the comparison result in the setting register.

According to a display device of the present invention, it is possible to detect failure of a logic circuit disposed in a later stage than a setting register inside a source driver.

DETAILED DESCRIPTION OF EMBODIMENTS

Figure 1:
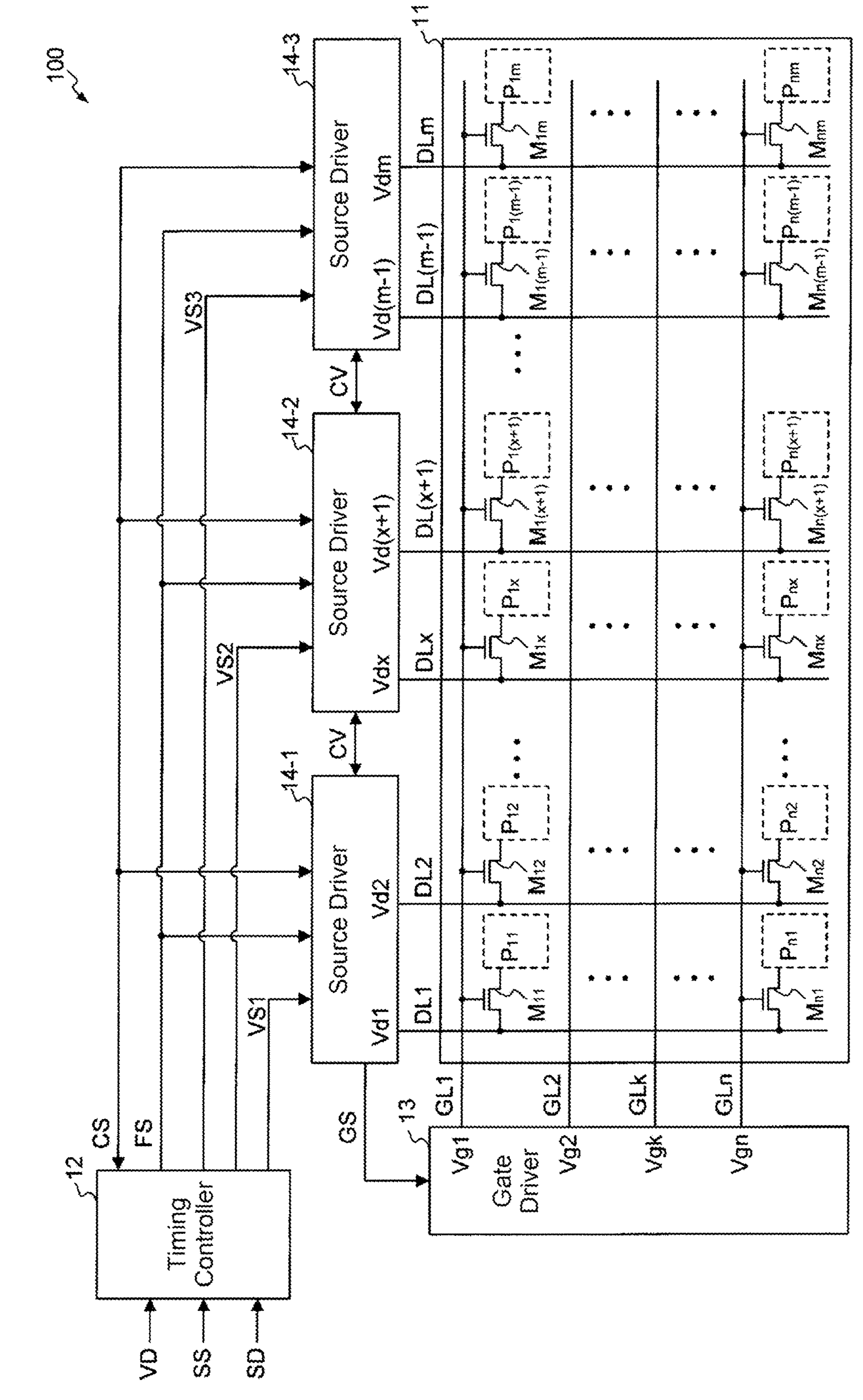
FIG. 1 is a block diagram illustrating a configuration of a display device of the present invention.

Below, embodiments of the present invention will be explained with reference to figures. In the descriptions of respective embodiments below and appended diagrams, the same reference characters are given to parts that are substantially the same as each other or equivalent to each other.

Embodiment 1

FIG. 1 is a block diagram illustrating a configuration of a display device 100 of the present invention. The display device 100 is an active-matrix liquid crystal display device. The display device 100 is an in-vehicle display device installed in a vehicle such as an automobile, and displays images representing a speedometer, fuel gage, and the like of the vehicle. The display device 100 includes a display panel 11, a timing controller 12, a gate driver 13, and source drivers 14-1, 14-2, and 14-3.

The display panel 11 is constituted of a semiconductor substrate on which a plurality of pixel parts P11 to Pnm and pixel switches M11 to Mnm (n is an integer of 2 or greater, m is an integer of 2 or greater and a multiple of 3) arranged in an x m matrix. The display panel 11 includes n-number of gate lines GL1 to GLn that are horizontal scanning lines and m-number of data lines DL1 to DLm arranged to intersect with those gate lines. The pixel parts P11 to Pnm and the pixel switches M11 to Mnm are disposed at respective intersections of the gate lines GL1 to GLn and the data lines DL1 to DLm, and arranged in a matrix.

The pixel switches M11 to Mnm are turned on and off according to gate signals Vg1 to Vgn supplied from the gate driver 13. The pixel parts P11 to Pnm receive gradation voltage signals Vd1 to Vdm corresponding to the video data from the source drivers 14-1 to 14-3. When the respective pixel switches M11 to Mnm are on, the gradation voltage signals Vd1 to Vdm are applied to respective pixel electrodes of the pixel parts P11 to Pnm, which charges the respective pixel electrodes. The luminance levels of the pixel parts P11 to Pnm are controlled in accordance with the gradation voltage signals Vd1 to Vdm in the respective pixel electrodes of the pixel parts P11 to Pnm.

In other words, through the operation of the gate driver 13, m-number of pixel parts arranged along the extending direction of the gate lines (that is, horizontally) are selected to receive the gradation voltage signals Vd1 to Vdm. The source drivers 14-1 to 14-3 apply the gradation voltage signals Vd1 to Vdm to the selected pixel parts in one line, causing the pixel parts to display colors corresponding to the voltages. By repeatedly selecting a different line of pixel parts to apply the gradation voltage signals Vd1 to Vdm in the extending direction of the data lines (vertical direction), a screen for one frame is displayed.

Each of the pixel parts P11 to Pnm includes liquid crystal sealed between a transparent electrode connected to a data line via a pixel switch and an opposite substrate facing the semiconductor substrate and constituted of one transparent electrode formed over the entire surface. By changing the transmittance of the liquid crystal for light from a backlight installed within the display device based on the voltage difference between the gradation voltage signals Vd1 to Vdm supplied to the pixel parts P11 to Pnm and the opposite substrate voltage, an image is displayed.

The timing controller 12 generates video data signals VS1 to VS3 each made of a series of pixel data pieces PD indicating the luminance level of each pixel with the luminance gradation of 8-bit and 256 levels, based on the video data VD. The timing controller 12 supplies the video data signal VS1 to the source driver 14-1, the video data signal VS2 to the source driver 14-2, and the video data signal VS3 to the source driver 14-3, respectively.

The timing controller 12 also generates a frame synchronization signal FS based on the synchronization signal SS, and supplies the signal to the source drivers 14-1 to 14-3. The frame synchronization signal FS is a signal indicating the timings of the video data signals VS1 to VS3 for every frame.

The timing controller 12 also performs setting communication between the source drivers 14-1 to 14-3, respectively (communication signal CS in FIG. 1). In the setting communication, setting data for the operation of each of the source drivers 14-1 to 14-3 is written and read, for example.

The gate driver 13 receives a gate control signal GS from the source driver 14-1, and supplies the gate signals Vg1 to Vgn sequentially to the gate lines GL1 to GLn based on a clock timing included in the gate control signal GS.

The source drivers 14-1 to 14-3 are arranged along the extending direction of the gate lines. The source drivers 14-1 to 14-3 are each connected to the adjacent source drivers (cascade connection), thereby constituting a source driver group made of three stages of source drivers.

The source drivers 14-1 to 14-3 each output gradation voltage signals (also referred to as source output below) of multiple channels (ch) corresponding to the number of data lines driven by that particular source driver. Respective source outputs correspond to three pixels of R (red), G (green), and B (blue) for every 3ch.

The source drivers 14-1 to 14-3 take in the pixel data pieces PD included in the video data signals VS1 to VS3 supplied from the timing controller 12 by one horizontal scanning line (that is, by the number of ch corresponding to the number of pixel data pieces in one horizontal scanning line for each of the source drivers), and generates gradation voltage signals Vd1 to Vdm corresponding to the luminance gradations indicated by the received pixel data pieces PD. Then the source drivers 14-1 to 14-3 apply the generated gradation voltage signals Vd1 to Vdm to the data lines DL1 to DLm of the display panel 11 as the source output.

The source driver 14-1, which is closer to the gate driver 13 than any other source drivers among the source drivers 14-1 to 14-3, generates a gate control signal GS based on the frame synchronization signal FS, and supplies the signal to the gate driver 13.

Each of the source drivers 14-1 to 14-3 exchanges checksum values CV with adjacent source drivers (cascade connected source drivers). The checksum value CV is an error detection code value calculated in each of the source drivers 14-1 to 14-3. The checksum value CV is a calculation result of the checksum calculation, which will be described later, executed by a checksum calculation circuit (not shown in FIG. 1) provided in each source driver.

Figure 2:
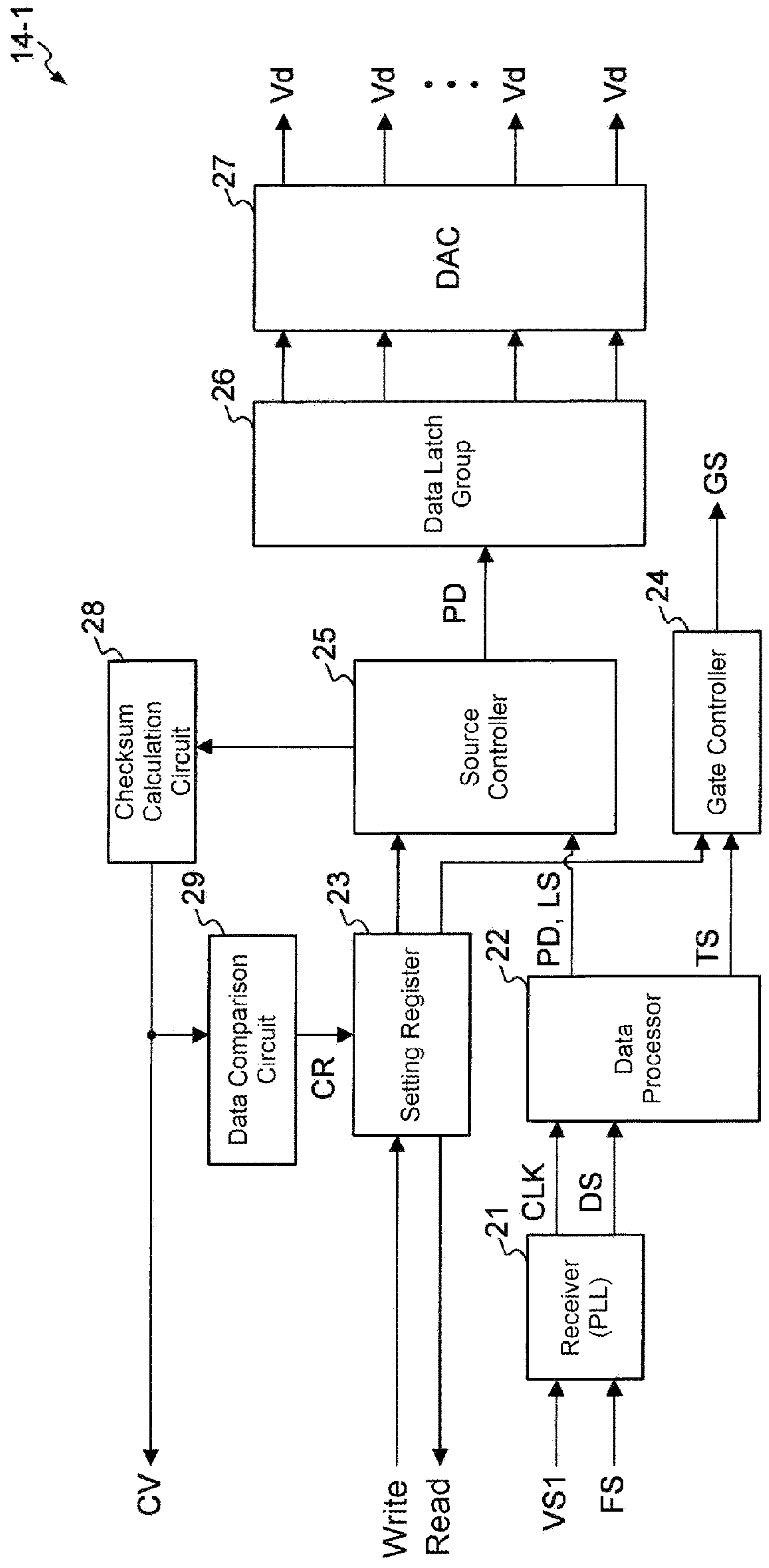
FIG. 2 is a block diagram illustrating a configuration of a source driver of Embodiment 1.

FIG. 2 is a block diagram illustrating the configuration of the source driver 14-1 of this embodiment. The source driver 14-1 includes a receiver (PLL) 21, a data processor 22, a setting register 23, a gate controller 24, a source controller 25, a data latch group 26, a DA (digital-to-analog) converter 27 (DAC 27), a checksum calculation circuit 28, and a data comparison circuit 29.

The receiver 21 receives the video data signal VS1 and the frame synchronization signal FS supplied from the timing controller 12. The receiver 21 includes a PLL (Phase Locked Loop) circuit, and generates a clock signal CLK based on the video data signal VS1 and the frame synchronization signal FS. The receiver 21 also generates a serial data signal DS synchronized with the clock signal CLK and supplies the signal to the data processor 22.

The data processor 22 performs serial-to-parallel conversion on the data signal DS, generates parallel pixel data pieces PD, and supplies them to the source controller 25. In addition, the data processor 22 generates a horizontal synchronization signal LS based on the data signal DS, and supplies the synchronization signal LS to the source controller 25.

Furthermore, the data processor 22 generates a timing control signal TS used for controlling the gate driver 13 based on the clock signal CLK, and supplies the timing control signal TS to the gate controller 24.

The setting register 23 is a register circuit that stores setting data regarding the operation of the source driver 14-1. The setting register 23 has setting data written thereto in accordance with the writing operation of the timing controller 12. Various types of data stored in the setting register 23 are read out to the timing controller 12, in accordance with the reading operation of the timing controller 12.

The gate controller 24 generates a gate control signal GS based on the timing control signal TS supplied from the data processor 22, and controls the gate driver 13.

The source controller 25 reads the setting data stored in the setting register 23 and controls the operation of the data latch group 26 based on the read-out setting data. For example, the source controller 25 supplies the parallel pixel data pieces PD supplied from the data processor 22 to the data latch group 26, and stores the pixel data pieces PD in the respective data latches constituting the data latch group 26 in sequence, using the horizontal synchronizing signal LS as a capture clock.

For example, based on the number of source driver chips (three in this embodiment) and setting data for the image display resolution, the number of effective source output channels in each source driver (here, the source driver 14-1) is determined. Thus, the source controller 25 controls the operation for capturing the pixel data pieces PD by the plurality of data latches constituting the data latch group 26 based on the information on the number of effective channels.

The data latch group 26 and the DA converter 27 are source output units that output gradation voltage signals in accordance with the control of the source controller. The data latch group 26 is constituted of a plurality of latch circuits for capturing the pixel data pieces PD. The plurality of latch circuits include, for example, the first latch circuit that captures the pixel data piece PD for each row, and the second latch circuit that captures the pixel data piece PD stored in the first latch circuit at the rise of the horizontal synchronizing signal LS.

The DA converter 27 selects the gradation voltage corresponding to the pixel data piece PD outputted from the data latch group 26, performs digital-to-analog conversion, and generates an analog gradation voltage signal Vd. The generated analog gradation voltage signal Vd is amplified by an output amplifier (not shown in FIG. 2) and is outputted to the data lines DL1 to DLm of the display panel 11 (corresponding data lines in the source driver 14-1).

The checksum calculation circuit 28 is a circuit that performs checksum calculation on the output of the logic circuit provided in the source controller 25 to derive the checksum value CV. In other words, the checksum calculation circuit 28 is a code value calculation circuit that calculates the checksum value CV, which is an error detection code value. The checksum calculation circuit 28 supplies the calculated checksum value CV to the data comparison circuit 29. The checksum calculation circuit 28 also supplies the checksum value CV to the source driver 14-2 through a cascade connection line. The source driver 14-2 is a source driver adjacent to the source driver 14-1 and connected to the source driver 14-1 via a cascade connection line.

The data comparison circuit 29 receives the checksum value CV from the checksum calculation circuit 28, and receives the checksum value CV from the source driver 14-2, which is a source driver adjacent to the source driver 14-1, via the cascade connection line. Then the data comparison circuit 29 compares those two checksum values with each other and stores the comparison result in the setting register 23.

The source drivers 14-2 and 14-3 have the same configuration as that of the source driver 14-1. As for the gate controller 24, only the gate controller 24 of the source driver 14-1, which is arranged in the vicinity of the gate driver 13, is configured to operate via the setting communication from the timing controller 12. That is, the gate controllers 24 in the source drivers 14-2 and 14-3 are configured not to operate.

In this embodiment, the timing controller 12 sets the source output of each of the source drivers 14-1, 14-2, and 14-3 in the same way. That is, the timing controller 12 writes the same setting data for the source control to the setting registers 23 of the source drivers 14-1, 14-2, and 14-3, respectively. The source controllers 25 of the source drivers 14-1, 14-2, and 14-3 perform the same control operation based on the same setting data.

Figure 3:
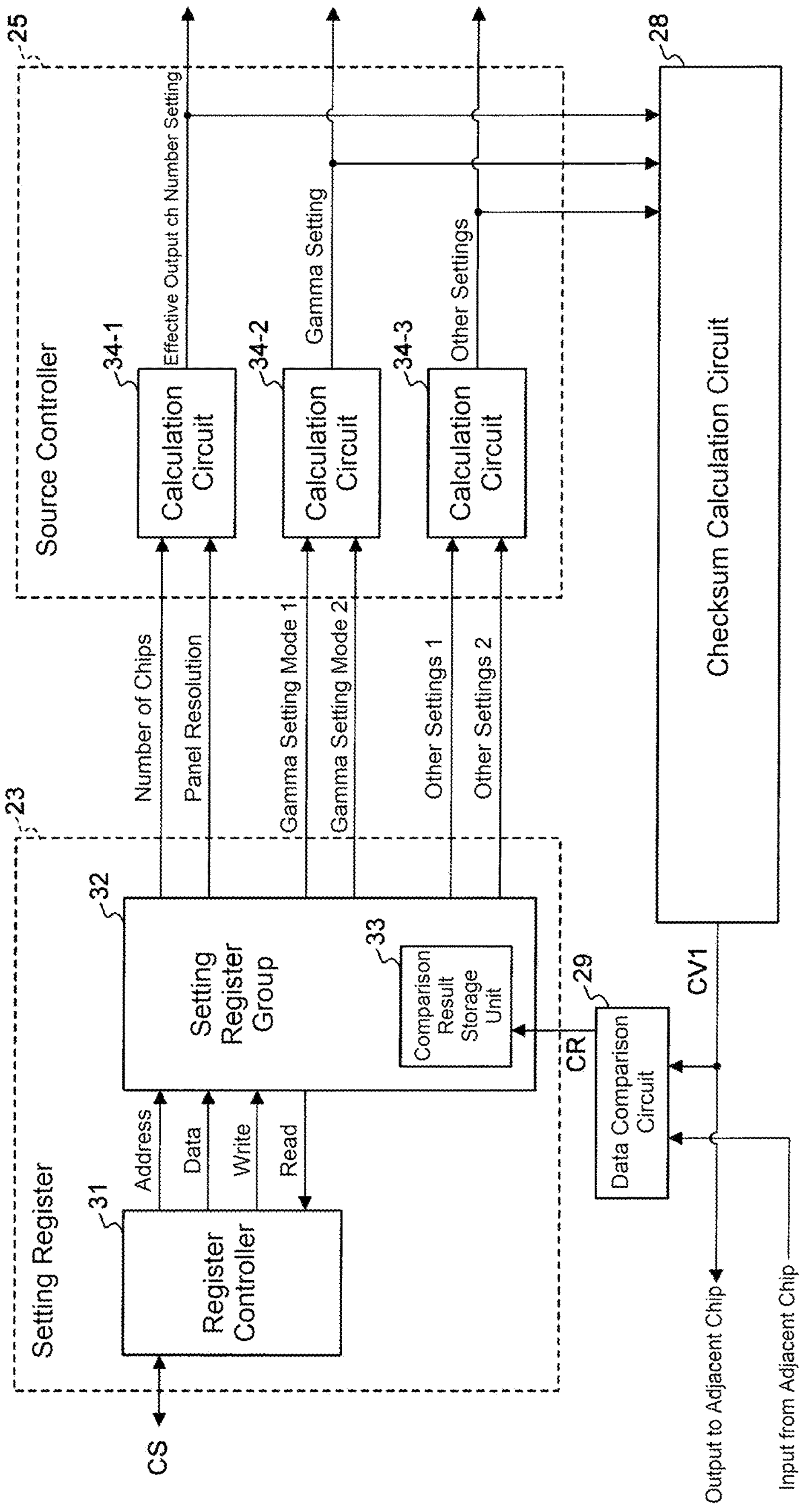
FIG. 3 is a block diagram illustrating an internal configuration of a setting register and a source controller of Embodiment 1.

FIG. 3 is a block diagram illustrating the internal configuration of the setting register 23 and the source controller 25 and how data is exchanged between those components and the checksum calculation circuit 28 and the data comparison circuit 29 in the source driver 14-1 of this embodiment.

The setting register 23 includes a register controller 31 and a setting register group 32. The setting register group 32 includes a comparison result storage unit 33.

The register controller 31 is a control unit that controls data storage in the setting register group 32 and data reading from the setting register group 32. The register controller 31 is accessed by the timing controller 12 via setting communication (communication signal CS), and controls data input and data output to/from the setting register group 32. For example, the register controller 31 specifies an address in the setting register group, supplies setting data to the specified address, and performs a reading/writing operation for various types of data.

The setting register group 32 is constituted of a plurality of D flip-flops, for example. By being accessed by the timing controller 12 via the register controller 31, as many D flip-flops as the number of setting items for the source controller 25, among the plurality of D flip-flops, receive and output signals.

In this embodiment, the setting register group 32 stores therein the setting data for setting the number of source drivers used for the operation of the display device 100 (that is, the chip number), the image display resolution, the gamma setting mode, which is information regarding the gamma curve configuration used for the gamma voltage generation by the gradation voltage generating circuit (not shown in the figure) provided in the source driver 14-1, and the like.

The source controller 25 includes calculation circuits 34-1, 34-2, and 34-3. The calculation circuits 34-1, 34-2, and 34-3 are logic circuits that respectively read out various types of setting data from the setting register group 32 and perform calculation to derive a setting value required for setting the source output (that is, the output of the gradation voltage signal) based on the read-out data.

The calculation circuit 34-1 performs calculation based on the setting data regarding the number of chips of the source drivers and the setting data regarding the panel resolution read from the setting register group 32 to derive a setting value for the number of effective output channels of the source driver 14-1.

The calculation circuit 34-2 performs calculation based on the setting data for the gamma setting mode 1 and the gamma setting mode 2 to derive a setting value for the gamma setting.

The calculation circuit 34-3 performs calculation based on other types of setting data (other setting 1 and other setting 2) to derive a setting value for other types of setting information regarding the source output.

The checksum calculation circuit 28 performs checksum calculation based on the calculation results of the calculation circuits 34-1, 34-2, and 34-3 to derive the checksum value CV1. The checksum calculation circuit 28 supplies the calculated checksum value CV1 to an adjacent chip (the source driver 14-2 in this embodiment) via the cascade connection line. Also, the checksum calculation circuit 28 supplies the calculated checksum value CV1 to the data comparison circuit 29.

The data comparison circuit 29 receives the checksum value CV1 from the checksum calculation circuit 28, and also receives the checksum value from a source driver adjacent to the source driver 14-1 (also referred to as the adjacent source driver below) obtained as a result of performing the same checksum calculation within the adjacent source driver.

In this embodiment, the source driver 14-1 is explained as an example, and thus, the adjacent driver is the source driver 14-2. Thus, the data comparison circuit 29 receives a checksum value CV2, which is the result of the checksum calculation in the source driver 14-2. If the source driver has two adjacent source drivers, then the data comparison circuit 29 receives two checksum values from the respective adjacent source drivers on both sides. For example, the source driver 14-2 has two adjacent source drivers (source drivers 14-1 and 14-3), and thus, the data comparison circuit 29 of the source driver 14-2 receives the checksum value CV1 from the source driver 14-1 and the checksum value CV3 from the source driver 14-3, respectively.

As described above, the source drivers 14-1, 14-2, and 14-3 are configured in the same manner in terms of the source control. Therefore, if no failure has occurred in any of the calculation circuits in the source controller 25 of each of the source drivers 14-1, 14-2, and 14-3, the checksum value calculated in each of the source drivers 14-1, 14-2, and 14-3 should be the same as each other.

The data comparison circuit 29 compares the checksum value CV1 calculated by the checksum calculation circuit 28 with the checksum value CV2 supplied from the adjacent source driver (in this embodiment, the source driver 14-2), and outputs a comparison result CR indicating the comparison result of those checksum values.

The comparison result CR is a binary signal indicating logic level 1 when the two checksum values CV match, and logic level 0 when they do not match, for example. The data comparison circuit 29 supplies the comparison result CR to the comparison result storage unit 33 within the setting register group 32.

Unlike this embodiment, if there are adjacent source drivers on both sides as in the case of source driver 14-2, then the data comparison circuit 29 compares the three checksum values, and outputs a comparison result CR, which indicates logic level 1 if they all match and logic level 0 if there is a non-matching checksum value.

The comparison result storage unit 33 stores the comparison result CR supplied from the data comparison circuit 29. The comparison result CR stored in the comparison result storage unit 33 can be read by a read operation via the register controller 31.

The timing controller 12 accesses the register controller 31 using setting communication (communication signal CS) and reads the comparison result CR. If the value of the comparison result CR indicates that the checksum values match (logical level 1 in this embodiment), then the timing controller 12 determines that no failure has occurred in the logic circuit provided in the source controller 25 of the source driver 14-1. On the other hand, if the comparison result CR indicates that the checksum values do not match (logical level 0 in this embodiment), then the timing controller 12 determines that failure has occurred in the logic circuit provided in the source controller 25 of the source driver 14-1.

As described above, in the display device 100 of this embodiment, the source driver 14-1 includes the checksum calculation circuit 28 that performs checksum calculation on the calculation results of the logic circuits (calculation circuits 34-1 to 34-3 in this embodiment) constituting the source controller 25 to derive a checksum value. Then, the display device 100 receives the checksum value calculated in the adjacent source driver from the adjacent source driver, and compares this with the checksum value CV1 which is the operation result of the checksum operation circuit 28. The comparison result CR is stored in the comparison result storage unit 33 provided in the setting register 23. The stored comparison result CR is read from the setting register 23 and supplied to the timing controller 12 when accessed by the timing controller 12.

With this configuration, the timing controller 12 can detect failure that has occurred in the logic circuits constituting the source controller 25 in the source driver (in other words, logic circuits provided in a later stage than the setting register) with ease by accessing the setting register 23 of the source driver 14-1 and reading out the comparison result CR.

Embodiment 2

Next, Embodiment 2 of the present invention will be explained. The display device of this embodiment differs from the display device 100 of Embodiment 1 in the configuration of the source drivers.

Figure 4:
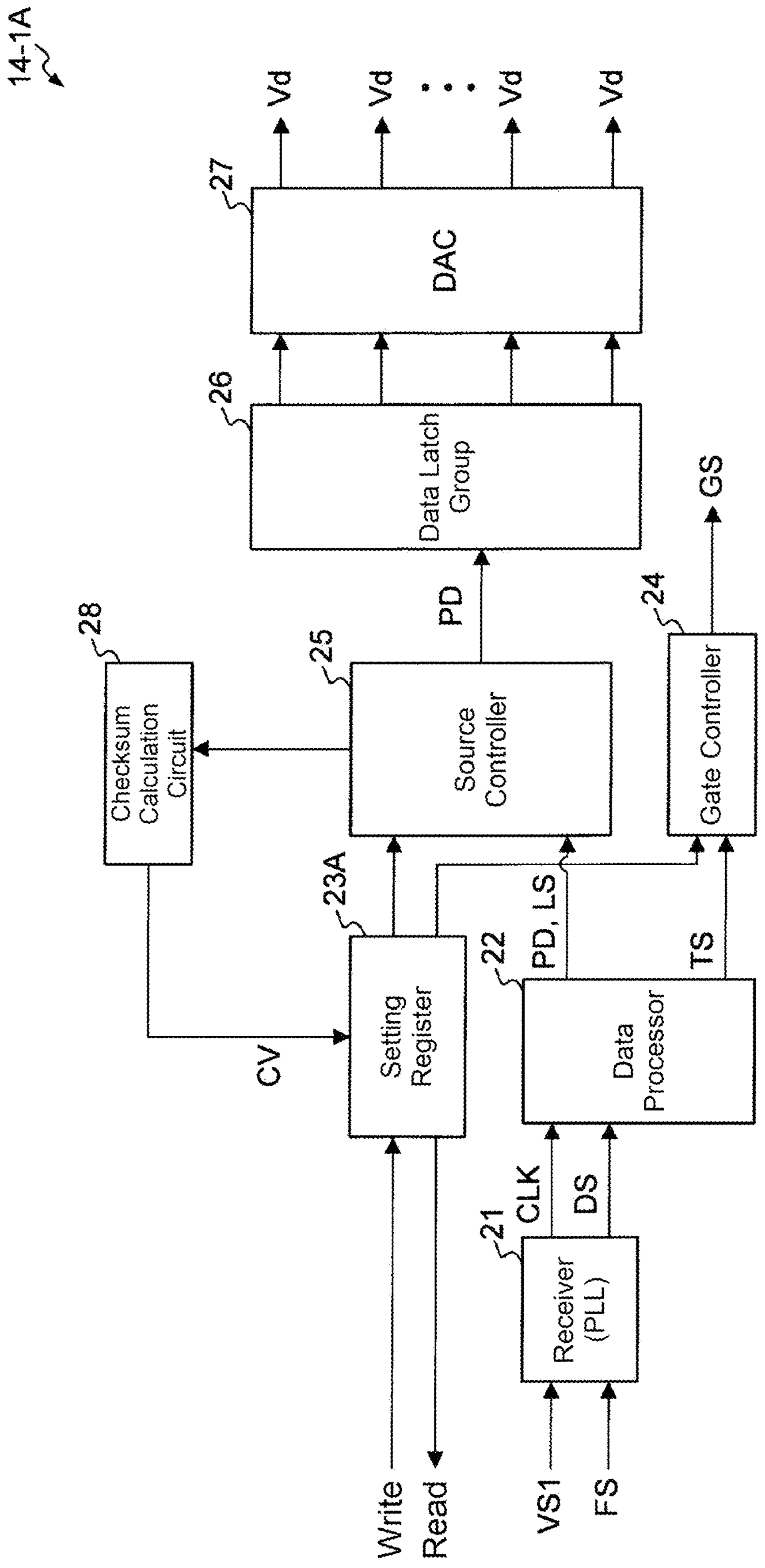
FIG. 4 is a block diagram illustrating a configuration of a source driver of Embodiment 2.

FIG. 4 is a block diagram illustrating the configuration of a source driver 14-1A in the display device of this embodiment.

Unlike the source driver 14-1 of Embodiment 1, the source driver 14-1A of this embodiment does not include a data comparison circuit for comparing the checksum value CV calculated by the checksum calculation circuit 28 with the checksum value CV of the adjacent source driver.

The checksum calculation circuit 28 stores the calculated checksum value CV in a setting register 23A.

Figure 5:
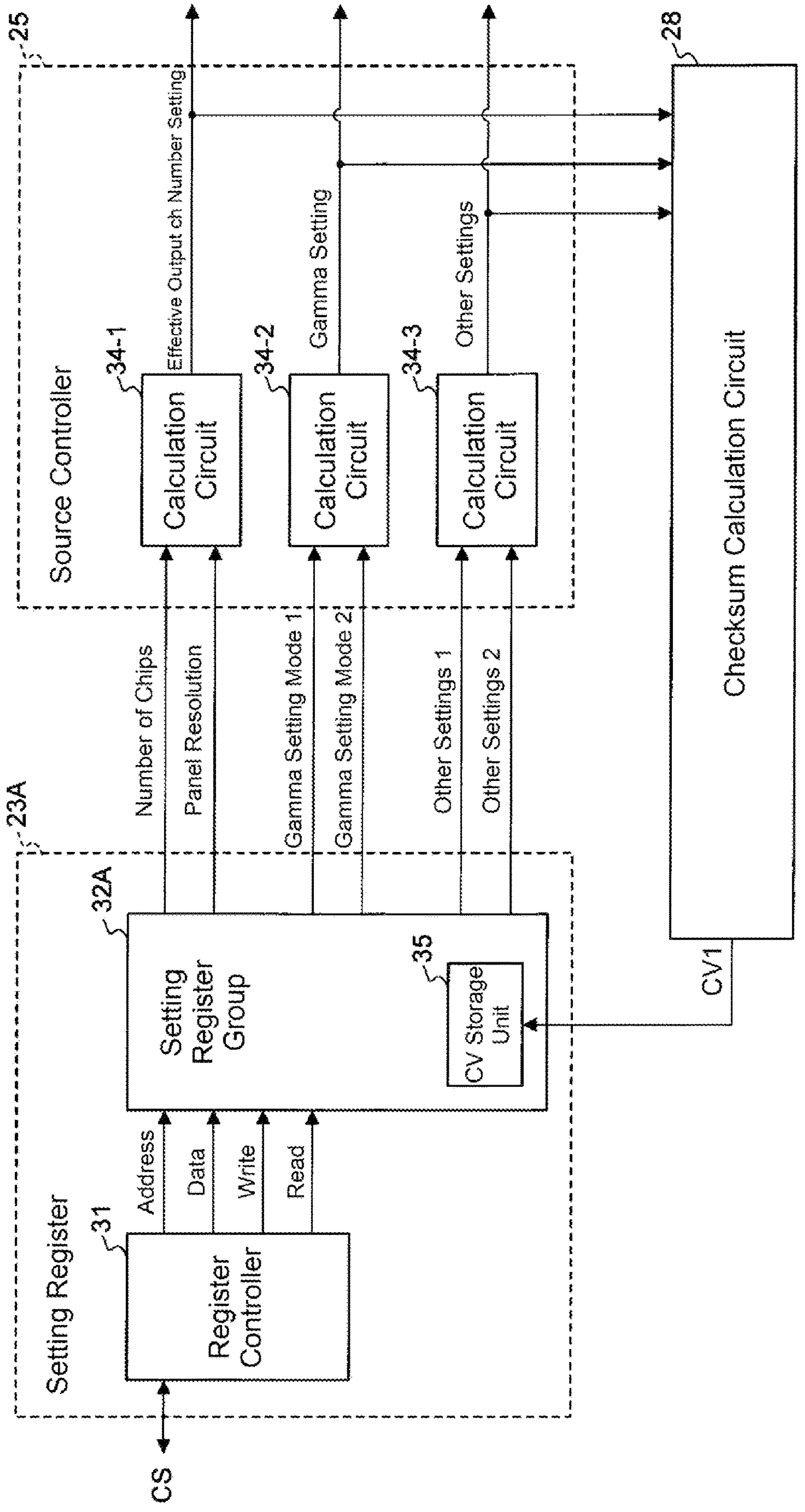
FIG. 5 is a block diagram illustrating an internal configuration of a setting register and a source controller of Embodiment 2.

FIG. 5 is a block diagram illustrating the internal configuration of the setting register 23A and the source controller 25 and how data is exchanged between those components and the checksum calculation circuit 28 in the source driver 14-1A of this embodiment.

The setting register 23A has a register controller 31 and a setting register group 32A. The setting register group 32A includes a CV storage unit 35 instead of the comparison result storage unit 33 of Embodiment 1.

The checksum calculation circuit 28 performs checksum calculation based on the calculation results of the calculation circuits 34-1, 34-2, and 34-3 to derive the checksum value CV1. The checksum calculation circuit 28 supplies the calculated checksum value CV1 to the CV storage unit 35 in the setting register group 32A. The checksum calculation circuit 28 does not supply the checksum value CV1 to any adjacent source drivers connected via a cascade connection line, unlike Embodiment 1.

The CV storage unit 35 provided in the setting register group 32 stores the checksum value CV1 therein. The checksum value CV1 stored in the CV storage unit 35 can be read by the read operation via the register controller 31.

A timing controller 12A of this embodiment accesses the register controller 31 using setting communication (communication signal CS) and reads the checksum value CV1 from the CV storage unit 35. Similarly, the timing controller 12A also reads the checksum values from the source drivers adjacent to the source driver 14-1 (the source drivers 14-2 and 14-3).

The timing controller 12A compares the checksum values read from the plurality of source drivers to determine whether or not failure has occurred in the logic circuit provided in the source controller 25 of any of the source drivers.

Figure 6:
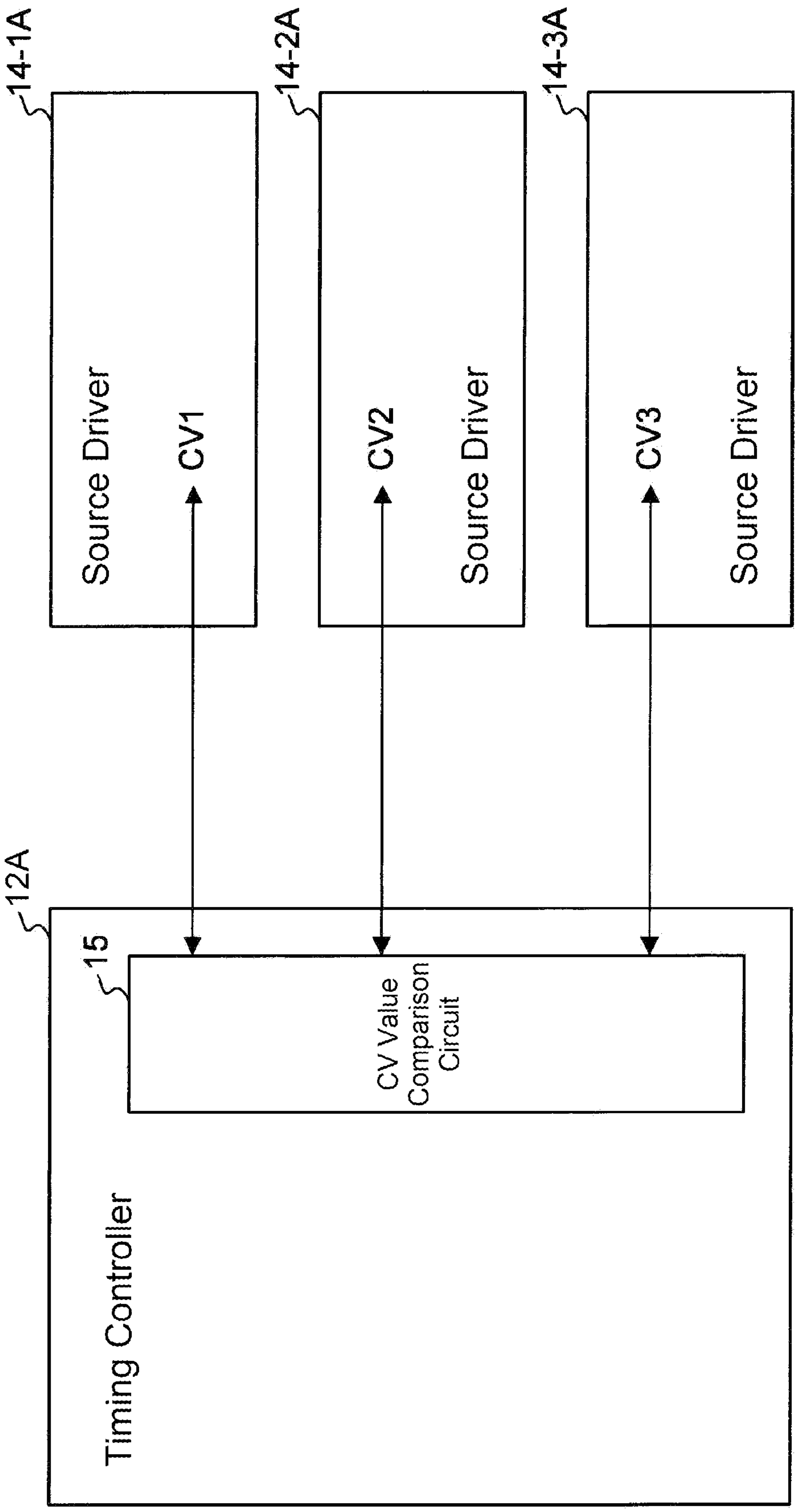
FIG. 6 is a block diagram schematically illustrating an operation to read a checksum value from each source driver performed by a timing controller of Embodiment 2.

FIG. 6 is a block diagram schematically illustrating an operation to read a checksum value from each source driver performed by the timing controller 12A of this embodiment.

The timing controller 12A has a CV comparison circuit 15 for comparing checksum values of the respective source drivers.

The timing controller 12A accesses the setting register 23A of each of the source drivers 14-1A, 14-2A, and 14-3A using setting communication, and reads the checksum values CV1, CV2, and CV3.

Then the CV comparison circuit 15 compares those checksum values CV1, CV2, and CV3 with each other, and generates a comparison result. In this embodiment, the comparison result indicates whether the checksum values CV1, CV2, and CV3 all match or not.

Based on the comparison result generated by the CV comparison circuit 15, the timing controller 12A determines whether failure has occurred in the logic circuits constituting the source controller 25 of any of the source drivers 14-1A, 14-2A and 14-3A or not. For example, if the checksum values CV1, CV2, and CV3 match, it is determined that no failure has occurred in the logic circuits of the source controller 25 in any of the source drivers. On the other hand, if the checksum values CV1, CV2, and CV3 do not match, it is determined that failure has occurred in the logic circuits of the source controller 25 in at least one of the source drivers.

If two of the checksum values CV1, CV2, and CV3 match and one is different, the timing controller 12A can identify which one of the source drivers has the source controller 25 with a failed logic circuit. For example, if the checksum values CV1 and CV2 match and the checksum value CV3 is different, the timing controller 12A determines that failure has occurred in the source driver 14-3A. That is, based on which ones of the checksum values CV1 to CV3 are the majority, the source driver to which the source controller 25 with a failed logic circuit belongs is identified (that is, majority decision).

As described above, in the display device of this embodiment, the source drivers each include the checksum calculation circuit 28 that performs checksum calculation on the calculation results of the logic circuits (calculation circuits 34-1 to 34-3 in this embodiment) constituting the source controller 25 to derive a checksum value. The checksum calculation circuit 28 stores the checksum value CV indicating the calculation result in the setting register 23A. The timing controller 12A reads the checksum values CV from the setting registers 23A of the respective source drivers, compares those checksum values, and determines whether or not those checksum values match.

With this configuration, the timing controller 12A can detect failure that has occurred in the logic circuits constituting the source controller 25 in the source driver (in other words, logic circuits provided in a later stage than the setting register) by comparing the checksum calculation results of the respective source drivers.

Also, with the configuration of this embodiment described above, because the timing controller compares the checksum values, it is not necessary for each source driver to compare its own checksum value with a checksum value of an adjacent source driver. Thus, it is possible to eliminate the need of exchanging the checksum values between the source drivers via the cascade connection lines.

The present invention is not limited to the embodiments described above. For example, in the embodiments above, a configuration was explained in which each source driver was provided with a checksum calculation circuit, and failure of the calculation circuits in the source controller was detected by comparing the checksum values, which are the calculation results of the checksum calculation. However, the error detection code value used for comparison is not limited to the checksum value. That is, a configuration may be adopted in which another type of error detection code value, such as a CRC code, is calculated and used for comparison to detect failure of the calculation circuits.

Also, in the embodiments above, a configuration was explained in which the display device was provided with three source drivers, and failure in the calculation circuits provided in the source controller of each source driver was detected based on the checksum calculation result in each source driver. However, the number of source drivers is not limited to this, and may be any number greater than 1 as long as there are at least two source drivers.

Furthermore, in the embodiments above, the display device was an in-vehicle display device but the configuration of the embodiments above may be applied to general display devices. However, by applying the configurations of the embodiments above to a display device required to ensure functional safety in particular, such as an in-vehicle display device, it is possible to achieve greater effects by detecting failure in logic circuits with ease and improving users' safety.

What is claimed is:

1. A display device, comprising:

a display panel having a plurality of data lines and a plurality of gate lines, and a plurality of pixel parts disposed at respective intersections of the plurality of data lines and the plurality of gate lines and arranged in a matrix;

a display controller that outputs a video data signal indicating a video to be displayed in the display panel; and a plurality of source drivers each receiving the video data signal from the display controller and supplying a gradation voltage signal to be outputted to the plurality of pixel parts through the plurality of data lines based on the video data signal, wherein each of the plurality of source drivers includes:

a setting register that stores setting data regarding an operation of a source driver;

at least one calculation circuit that performs calculation based on the setting data stored in the setting register to derive a setting value for the gradation voltage signal to be outputted;

a source output unit that outputs the gradation voltage signal to be supplied to each of the plurality of pixel parts based on the video data signal and the setting value; and a code value calculation unit that calculates an error detection code value corresponding to the setting value based on a calculation result of the at least one calculation circuit, wherein the display controller detects failure that has occurred in the at least one calculation circuit in the plurality of source drivers, using information based on the calculation result of the error detection code value, wherein one source driver of the plurality of source drivers includes a comparison unit that obtains the error detection code value calculated in other source drivers, and compares the error detection code value calculated in the other source drivers with the error detection code value calculated by the one source driver, and wherein the display controller detects failure that has occurred in the at least one calculation circuit in the plurality of source drivers, based on a comparison result of the comparison unit of the one source driver.

2. A display device, comprising:

a display panel having a plurality of data lines and a plurality of gate lines, and a plurality of pixel parts disposed at respective intersections of the plurality of data lines and the plurality of gate lines and arranged in a matrix;

a display controller that outputs a video data signal indicating a video to be displayed in the display panel; and a plurality of source drivers each receiving the video data signal from the display controller and supplying a gradation voltage signal to be outputted to the plurality of pixel parts through the plurality of data lines based on the video data signal, wherein each of the plurality of source drivers includes:

a setting register that stores setting data regarding an operation of a source driver;

at least one calculation circuit that performs calculation based on the setting data stored in the setting register to derive a setting value for the gradation voltage signal to be outputted;

a source output unit that outputs the gradation voltage signal to be supplied to each of the plurality of pixel parts based on the video data signal and the setting value; and a code value calculation unit that calculates an error detection code value corresponding to the setting value based on a calculation result of the at least one calculation circuit, wherein the display controller detects failure that has occurred in the at least one calculation circuit in the plurality of source drivers, using information based on the calculation result of the error detection code value, wherein the plurality of source drivers are arranged along an extending direction of the gate lines such that respective adjacent source drivers are connected to each other via a connection line, wherein each of the plurality of source drivers has a comparison unit that receives the error detection code value calculated in an adjacent source driver, and compares the received error detection code value with the error detection code value calculated by the code value calculating unit of the source driver that the comparison unit belongs to, and wherein the display controller detects failure that has occurred in the at least one calculation circuit in the plurality of source drivers, based on a comparison result of the comparison unit in each of the plurality of source drivers.

3. The display device according to claim 1, wherein the comparison unit stores the comparison result in the setting register, and wherein the display controller detects failure that has occurred in the at least one calculation circuit in the plurality of source drivers, by reading the comparison result from the setting register.

4. The display device according to claim 1, wherein the display controller obtains the error detection code value calculated in each of the plurality of source drivers, and detects failure that has occurred in the at least one calculation circuit in the plurality of source drivers based on the obtained error value.

5. The display device according to claim 1, wherein the code value calculation unit stores the error detection code value in the setting register, and wherein the display controller detects failure that has occurred in the at least one calculation circuit in the plurality of source drivers, by reading out the error detection code value from the setting register of each of the plurality of source drivers, and comparing the read-out error detection code values.

6. The display device according to claim 1, wherein the code value calculation unit performs a checksum calculation based on the calculation result of the at least one calculation circuit, and uses a checksum value obtained as a result of the checksum calculation for the error detection code value.

7. A source driver connected to a display panel that has a plurality of data lines, a plurality of gate lines, and a plurality of pixel parts disposed at respective intersections of the plurality of data lines and the plurality of gate lines and arranged in a matrix, wherein the source driver is one of a plurality of source drivers arranged along an extending direction of the plurality of gate lines, wherein the source driver receives a video data signal indicating a video to be displayed in the display panel from a display controller and supplies a gradation voltage signal to be outputted to the plurality of pixel parts through the plurality of data lines based on the video data signal, wherein the source driver includes:

a setting register that stores setting data regarding an operation of the source driver;

at least one calculation circuit that performs calculation based on the setting data stored in the setting register to derive a setting value for the gradation voltage signal to be outputted;

a code value calculation unit that calculates an error detection code value corresponding to the setting value based on a calculation result of the at least one calculation circuit; and a comparison unit that obtains the error detection code value calculated in other source drivers, compares the error detection code value calculated in the other source drivers with the error detection code value calculated by the code value calculation unit, and stores the comparison result in the setting register.

8. The source driver according to claim 7, wherein the source driver is connected to an adjacent source driver among the plurality of source drivers via a connection line, and wherein the comparison unit receives an error detection code value calculated in the adjacent source driver via the connection line, and compares the received error detection code value with the error detection code value calculated by the code value calculation unit.

9. The source driver according to claim 7, wherein the code value calculation unit performs a checksum calculation based on the calculation result of the at least one calculation circuit, and uses a checksum value obtained as a result of the checksum calculation for the error detection code value.

* * * * *